Patented Aug. 31, 1948

2,448,391

UNITED STATES PATENT OFFICE 2,448,391

ALKENYL SILANE INTERPOLYMERS

James J. Pyle, Pittsfield, Mass., assignor to General Electric Company, a corporation of New York No Drawing. Application October 15, 1946, Serial No. 703,280

3 Claims. (Cl. 260—86)

The present invention relates to interpolymers of alkenylsilanes and polymerizable organic compounds containing ethylenic radicals.

A primary object of the present invention is to provide polymerizable compositions comprising (1) a polymerizable organic compound capable of undergoing polymerization due to the presence therein of at least one terminal ethylenic group selected from the class consisting of vinyl and allyl groups and (2) an alkenylsilane containing at least two silicon-bonded alkenyl radicals selected from the class consisting of allyl and vinyl radicals.

It has previously been proposed to co- or interpolymerize organic substances capable of undergoing such reactions with certain esters of silicic acid in which the ester group is an alkenyl radical such as an allyl radical. However, due to the fact that such esters are easily hydrolyzed the resultant products, whether in the form of plastics, lacquers or the like, have a tendency to deteriorate in the presence of moisture and, therefore, have little commercial utility. The resinous products of the present invention are primarily distinguished from such products by the fact that they are very resistant to attack by moisture.

Various polymerizable organic compounds may be employed in the practice of the present invention, all of the compounds being characterized by the presence therein of a polymerizable ethylenic radical. Examples of such carbon compounds containing at least one terminal $CH_2=C=$ group are styrene, vinyl chloride, vinylidene chloride, methyl methacrylate, methyl acrylate, methyl alpha-chloroacrylate, vinyl acetate, vinyl propionate, ethyl methacrylate, butyl methacrylate, methacrylic acid, vinyl acrylate, allyl acrylate, beta-methylallyl acrylate, ethyl acrylate, methyl vinyl ketone, ethyl vinyl ether, vinyl oleate, allyl crotonate, diallyl phthalate, diallyl maleate, divinyl phthalate, diallyl itaconate, ethyl itaconate, divinyl ether, butadiene, 2-chlorobutadiene, isobutylene, N-vinyl carbazole, 2-vinyl benzofuran, divinyl benzene, etc.

All of the above-described thermoplastic materials have previously been used for molding or coating applications. Many of them including the more readily available materials have been found lacking in solvent resistance or are subject to "cold flow," that is, they have a tendency to deform when subjected to slight stresses or somewhat elevated temperatures over long periods of time. The present invention is based on the discovery that by co- or inter-polymerizing such materials with certain hydrocarbon-substituted silanes containing at least two and preferably at least three silicon-bonded alkenyl radicals, products are obtained having improved solubility characteristics and an increased resistance to the type of deformation referred to hereintofore as "cold flow." Such products are suitable for various coating, impregnating, casting, and forming applications.

The alkenylsilanes employed in the practice of the present invention may be broadly described as substituted silanes containing at least two and preferably at least three silicon-bonded lower alkenyl radicals selected from the group consisting of vinyl and allyl radicals, the remainder of the four silicon valences being satisfied by lower alkyl (methyl, propyl, etc.) or aryl (phenyl, tolyl, etc.) radicals. While not restricted thereto, the invention will be particularly described with reference to the use of allyl or vinyl silanes in which the remaining organic radicals, if any, are lower alkyl, specifically methyl, radicals.

Example 1

A quantity of allylmagnesium bromide was prepared by placing 75 g. (approx. 3 mols) of magnesium turnings and 200 ml. of anhydrous ether in a 2-liter, 3-necked flask equipped with a stirrer, dropping funnel and a reflux condenser and adding a solution of 87 ml. (121.6 g. or approx. 1 mol) of allyl bromide in 570 ml. of anhydrous ether over a period of 4½ hours. The reaction was started by crushing a piece of magnesium in an ethereal solution of allyl bromide and adding it to the main portion along with a crystal of iodine. Considerable heat evolution took place. The rate of addition was such that gentle refluxing occurred. After the addition of the allyl bromide solution was complete, the resulting mixture was stirred over-night. It was afterwards refluxed for ½ to ¾ hour, filtered quickly through a coarse filter to remove unreacted magnesium and was then ready for use. It has been found desirable to use an excess of magnesium in the preparation of the allylmagnesium bromide since a mol to mol ratio of magnesium and allyl bromide favors the formation of diallyl $$(CH_2=CH-CH_2-CH_2-CH=CH_2)$$

In order to prepare tetraallylsilane, the ethereal solution of allylmagnesium bromide, prepared above, was placed in a 1-liter, 3-necked flask and 30 g. of freshly distilled silicon tetrachloride in 60 ml. ether was added dropwise to the solution. Considerable heat evolution occurred and the addition of the silicon tetrachloride solution was regulated at such a rate that gentle refluxing was maintained. Occasionally the reaction mixture had to be cooled by immersing the flask in a water bath. After all of the silicon tetrachloride had been added, the mixture was refluxed for ½ hour and then added to ice water whereby two clear layers formed. The ethereal layer was separated, dried over anhydrous sodium sulfate, filtered and the solvent evaporated. The residual light yellow liquid was distilled in vacuo. A small forerun was rejected. The rest of the liquid boiled at 63–65° at 1.25–1.4 mm. and was obtained in the form of a colorless, mobile liquid. Part of the product, distilling at 63–65° at 1.25–1.4 mm. pressure was redistilled to obtain a sample of substantially pure tetraallyl silane boiling at 69–69.5° at 2 mm.

Employing the above-described tetraallylsilane, two copolymers thereof with styrene were prepared containing respectively 16⅔ and 50 percent by weight of the silane derivative. In order to compare the properties of the copolymers with polystyrene and the tetraallylsilane polymer, styrene and tetraallylsilane were separately polymerized under identical conditions. Five tenths of one percent by weight of benzoyl peroxide was added to each of the samples as a polymerization catalyst. All of the samples were heated in closed containers for 24 hours at 60° C., and were then transferred to an oven at 90° C. for 24 hours. It was observed that at the end of the first heat treatment at 60° C. the two mixtures of styrene and tetraallylsilane and the pure tetraallylsilane were polymerizing at a rate which was comparatively slow as compared with the styrene sample. At 90° C. the polymerization of these products however appeared to proceed at a much faster rate. A comparison of the final products showed that the tetraallylsilane polymer was brittle and infusible, while the styrene-tetraallylsilane copolymers were gels which did not melt at 210° C. and did not dissolve in benzene.

*Example 2*

The following series of experiments illustrates the effect of tetraallylsilane when 10 percent by weight of various mixtures of a polymerizable vinyl compound and tetraallylsilane are polymerized:

(1) 90% styrene+10% tetraallylsilane
(2) 90% methylacrylate+10% tetraallylsilane
(3) 90% vinyl acetate+10% tetraallylsilane Two percent benzoyl peroxide was added to each of the three samples which were then heated in closed vials for 24 hours at 60° C., then for 48 hours at 90° C., and finally baked at 105° C. for 2 days. The tetraallylsilane crosslinked with all three monomers as was indicated by their insolubility in benzene. When heated on a hot plate at 210° C. the styrene-tetraallylsilane polymer did not melt, while the methylmethacrylate-tetraallylsilane polymer did not melt and seemed harder at room temperature than the pure polymer of methylmethacrylate. The vinyl acetate-tetraallylsilane copolymer did not melt and was harder than the pure polymer of vinyl acetate.

*Example 3*

Triallylmethylsilane was prepared by reacting methyltrichlorosilane with an ether solution of allylmagnesium bromide. A master batch of allylmagnesium bromide was prepared by placing 33 g. of magnesium turnings and 90 ml. of anhydrous ether in a 1-liter, 3-necked flask equipped with stirrer, reflux condenser and dropping funnel and slowly adding over a period of 2 hours 59 g. of allyl bromide dissolved in 230 ml. of anhydrous ether. Reaction was initiated and controlled as described in Example 1. The reaction was allowed to proceed over-night at room temperature and then at reflux temperature for ½ hour. After filtering the solution to remove excess magnesium the solution was divided into 2 equal portions. One portion of the solution of allylmagnesium bromide was placed in a 3-necked flask equipped with stirrer, reflux condenser and dropping funnel and a solution of 10 ml. of methyltrichlorosilane in 50 ml. of anhydrous ether was added slowly through the dropping funnel over a period of ½ hour, maintaining gentle refluxing. After all of the methyltrichlorosilane solution had been added, the mixture was refluxed for ¾ hour. It was then decomposed by pouring upon ice. The ether layer was separated and dried over anhydrous sodium sulfate. After filtering and evaporating the solvent, the residual light yellow liquid was distilled at 38 mm. pressure. Rejecting the forerun, the rest of the liquid (triallylmethylsilane) distilled at 86–89° C. Several ml. of liquid polymerized in the flask during the distillation.

A larger quantity of triallylmethylsilane was prepared using the entire quantity of allylmagnesium bromide prepared according to the same method. Thirty-five grams of methyltrichlorosilane was reacted with this amount of Grignard reagent. The product distilled at 84–85° C. at 32 mm. pressure.

In order to determine whether the triallylmethylsilane would also undergo additive polymerization with various vinyl compounds the following series of polymers were prepared:

(1) Vinyl acetate
(2) Vinyl acetate+10% triallylmethylsilane
(3) Methylmethacrylate
(4) Methylmethacrylate+10% triallylmethylsilane Two percent benzoyl peroxide was added to each of the four samples. Samples 1 and 3 served as reference materials. The four samples in closed vials were put in an oven at 60° C. for two days. After a few hours all four samples were hard. They were then transferred to an oven at 100° C. and left there for two days.

Sample No. 2 assumed a reddish color, was transparent and showed definite cross-linking as shown by its infusibility and insolubility in benzene. Sample No. 4 was clear, colorless and was likewise infusible and insoluble in benzene.

Vinyl chloride was copolymerized with 10% by weight triallylmethylsilane in the presence of 0.5% benzoyl peroxide. The polymerization was carried out in a sealed tube by immersing it in a water bath at 45° C. for three days. A white powdery mass formed in the tube. The powder was much less fusible than a comparable sample of polyvinylchloride and was insoluble in cyclohexane.

Infusible interpolymers may also be made by using diallyldimethylsilane in place of the triallylmethylsilane or tetraallylsilane in the above examples.

*Example 4*

Tetravinylsilane was prepared by reacting vinylmagnesium bromide and silicon tetrachloride. In a 2-liter, 3-necked flask, equipped with stirrer, reflux condenser and dropping funnel with cooling mantle, was placed 48 g. of magnesium turnings and covered with 600 ml. of anhydrous ether.

A solution of 142 ml. of vinylbromide in 200 ml. of cold, anhydrous ether was added slowly through the dropping funnel. A small amount of iodine was added to start the reaction. The reaction set in very violently and had to be cooled with an ice-bath. After the violence of the reaction had subsided, the mixture was refluxed over-night. It formed a dark, almost black solution. The solution was decanted from the unreacted magnesium.

To the ethereal solution of vinylmagnesium bromide, prepared above, was added a solution of 20 ml. silicon tetrachloride in 100 ml. of ether. The reaction occurred with considerable heat evolution. After all of the silicon tetrachloride solution had been added, the mixture was refluxed for 1 hour. It was then decomposed in ice water, the yellow ethereal layer was separated and dried over anhydrous sodium sulfate. After filtering, the ether was evaporated and the residual dark liquid distilled in vacuo. After discarding a small forerun the tetravinylsilane distilled at 66° C. at 0.3 mm. pressure.

A copolymer of styrene and tetravinylsilane was prepared by mixing styrene with 10% tetravinylsilane, adding approximately 1.8% benzoyl peroxide and placing the mixture in an oven at 60° C. for 24 hours. The mixture did not seem to polymerize at this temperature. It was then transferred to an oven at 80° C. After a few hours polymerization set in rapidly. The sample was left at 80° C. for 3 days, and then at 110° C. for 1 day. Cross linking occurred to some extent. The gel-like mass hardened more on the hot plate to produce a completely cross-linked polymer.

Trivinylmethylsilane and divinyldimethylsilane may be prepared in a similar manner using equivalent amounts of methyltrichlorosilane and dimethyldichlorosilane in place of the silicon tetrachloride. Tetra-2-methylallylsilane and tri-2-methylallylmethylsilane may be prepared in a similar manner as described above for tetraallylsilane and triallylmethylsilane by using an equivalent amount of 2-methylallylmagnesium bromide in place of allylmagnesium bromide. Likewise mixed allylvinylsilanes may be prepared by first reacting the desired chlorosilane with an amount of allylmagnesium halide insufficient to react with all of the chlorine atoms of the chlorosilane and then reacting the mixture with vinylmagnesium bromide in an amount sufficient to react completely with the remaining chlorine atoms of the chlorosilane. I prefer to use allyl or vinyl bromide instead of the corresponding iodides or chlorides due to ease of reaction and handling of the bromides.

These materials can then be used to form interpolymers in a manner similar to that disclosed in the above examples. For best results the alkenylsilane should have a functionality greater than one, i. e., should contain at least two and preferably at least three silicon-bonded alkenyl radicals.

Instead of benzoyl peroxide, other vinyl polymerization catalysts may be used to cause polymerization of these new polymerizable mixtures. Such catalysts are mixed peroxides, e. g., acetyl benzoyl peroxide; persulfates, e. g., potassium persulfate; perborates, e. g., sodium perborate; hydroperoxides, e. g., tertiarybutyl hydroperoxide, cyclohexyl hydroperoxide; etc.

What I claim as new and desire to secure by Letters Patent of the United States is:

1. An interpolymer of styrene and tetraallylsilane, the tetraallylsilane being present in an amount equal to from 10 to 50 per cent, by weight, of the total weight of the interpolymer.

2. The process which comprises heating a mixture comprising, by weight, (1) from 10 to 50 per cent tetraallylsilane and (2) from 50 to 90 per cent styrene until a solid product is obtained.

3. The process which comprises heating, in the presence of a vinyl polymerization catalyst, a mixture comprising, by weight, (1) from 50 to 90 per cent styrene and (2) from 10 to 50 per cent tetraallylsilane, the said heating being conducted until a solid product is formed.

JAMES J. PYLE.

REFERENCES CITED

The following references are of record in the file of this patent:

UNITED STATES PATENTS

| Number | Name | Date |
|---|---|---|
| 2,388,161 | Kropa | Oct. 30, 1945 |

FOREIGN PATENTS

| Number | Country | Date |
|---|---|---|
| 362,750 | Germany | Oct. 31, 1922 |

OTHER REFERENCES

Fieser et al.: Organic Chemistry, Heath, 1944, pp. 154 and 155.